US011496020B2

(12) United States Patent
Ashley

(10) Patent No.: US 11,496,020 B2
(45) Date of Patent: Nov. 8, 2022

(54) MAGNETIC FLYWHEEL ENERGY MANAGEMENT SYSTEM AND METHOD

(71) Applicant: DA GLOBAL ENERGY, INC., San Francisco, CA (US)

(72) Inventor: Donald James Ashley, San Jose, CA (US)

( * ) Notice: Subject to any disclaimer, the term of this patent is extended or adjusted under 35 U.S.C. 154(b) by 292 days.

(21) Appl. No.: 16/758,606

(22) PCT Filed: Nov. 8, 2017

(86) PCT No.: PCT/US2017/060715
§ 371 (c)(1),
(2) Date: Apr. 23, 2020

(87) PCT Pub. No.: WO2018/189548
PCT Pub. Date: May 17, 2018

(65) Prior Publication Data
US 2021/0184539 A1  Jun. 17, 2021

Related U.S. Application Data

(60) Provisional application No. 62/549,374, filed on Aug. 23, 2017, provisional application No. 62/437,602, (Continued)

(51) Int. Cl.
*H02K 7/02* (2006.01)
*H02J 3/38* (2006.01)
(Continued)

(52) U.S. Cl.
CPC ............... *H02K 7/025* (2013.01); *H02J 3/30* (2013.01); *H02J 3/381* (2013.01); *H02J 7/35* (2013.01); *H02P 9/02* (2013.01)

(58) Field of Classification Search
CPC .. H02K 7/025; H02J 3/30; H02J 3/381; H02J 7/35; H02P 9/02; Y02E 60/16; Y02T 10/64
See application file for complete search history.

(56) References Cited

U.S. PATENT DOCUMENTS 6,175,178 B1 * 1/2001 Tupper .................. H02K 7/025
310/210
2005/0077881 A1 * 4/2005 Capp ......................... H02J 3/30
322/29

(Continued)

*Primary Examiner* — Toan T Vu
(74) *Attorney, Agent, or Firm* — Stephen E. Zweig

(57) ABSTRACT

Flywheel based electrical energy management system and device. The device will often comprise at least one shaft mounted flywheel, each flywheel comprising a flywheel mass that contains a plurality of permanent magnets. The flywheel spins within at least one stator comprising a plurality of magnetic pickup coils configured so that the flywheel mass can rotate freely within the stator. The flywheel may be placed in a vacuum chamber and be supported by magnetic bearings. The flywheel shaft(s) are typically connected to one or more axial mounted motor generators, and the system further typically comprises a storage battery and control processor. The system handles a variety of different and not always stable input power sources, and converts this to continuous, efficient and stable electrical power. The system can handle a variety of clients, such as buildings, electric vehicles, and the like, and can operate under a variety of challenging conditions.

19 Claims, 10 Drawing Sheets

Related U.S. Application Data filed on Dec. 21, 2016, provisional application No. 62/418,936, filed on Nov. 8, 2016.

(51) Int. Cl.
    *H02J 3/30*         (2006.01)
    *H02J 7/35*         (2006.01)
    *H02P 9/02*         (2006.01)

(56) References Cited

U.S. PATENT DOCUMENTS

| | | | |
|---|---|---|---|
| 2007/0173392 A1* | 7/2007 | Stanford .......... | A63B 23/03541 482/904 |
| 2010/0018344 A1* | 1/2010 | Spears ................ | H02K 7/025 74/572.12 |
| 2012/0306418 A1* | 12/2012 | Fradella ............. | F16C 39/066 318/400.29 |

* cited by examiner

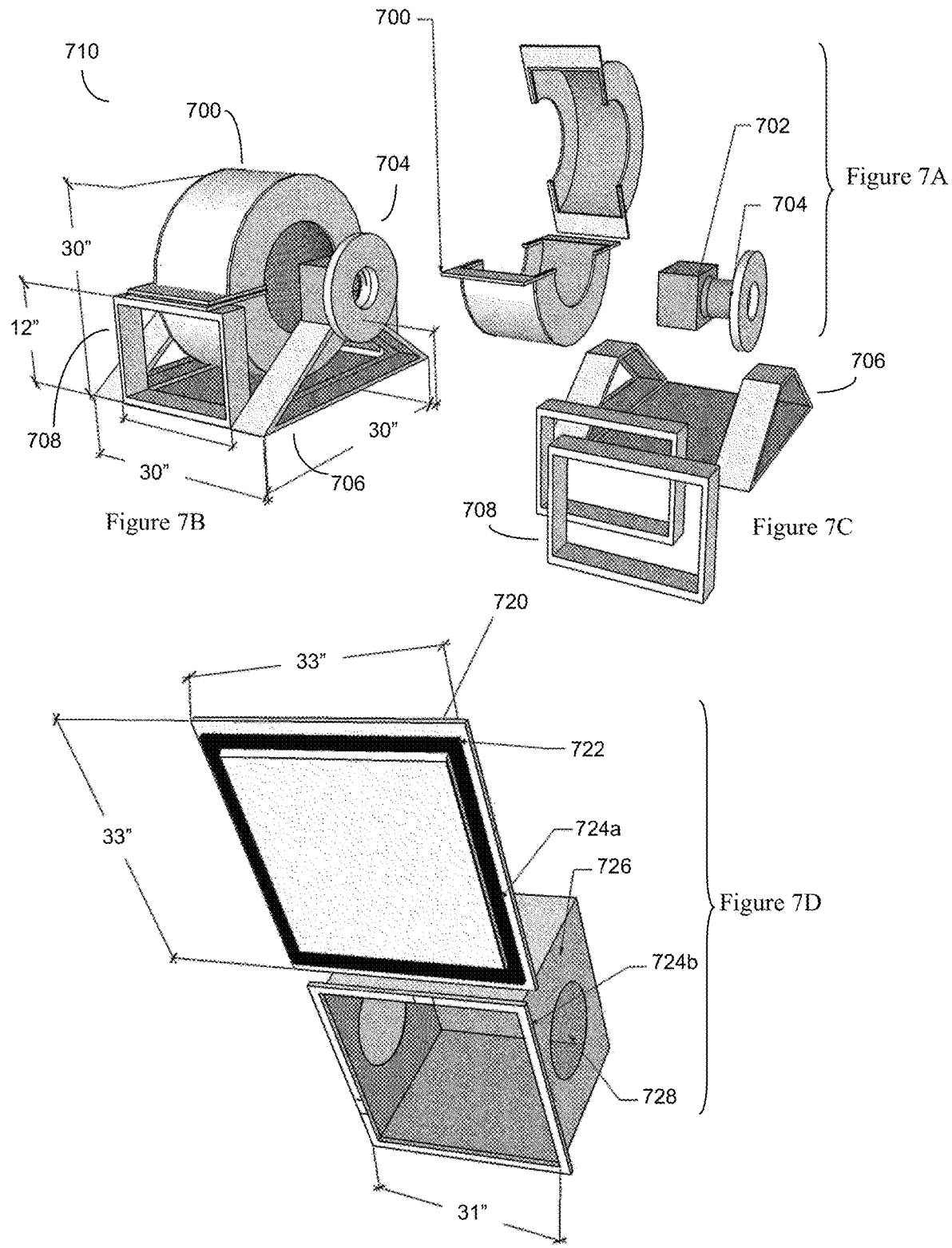

Figure 8A
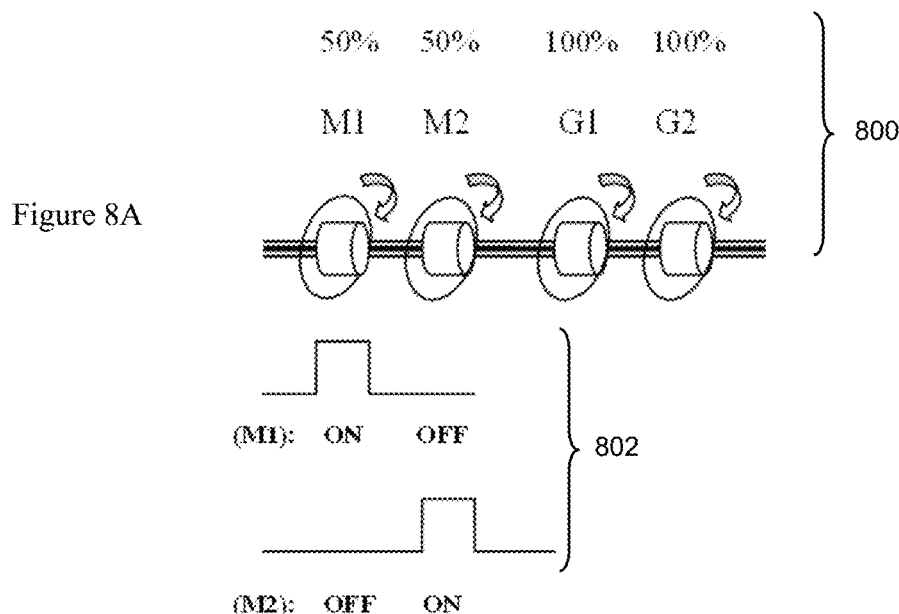
Figure 8B
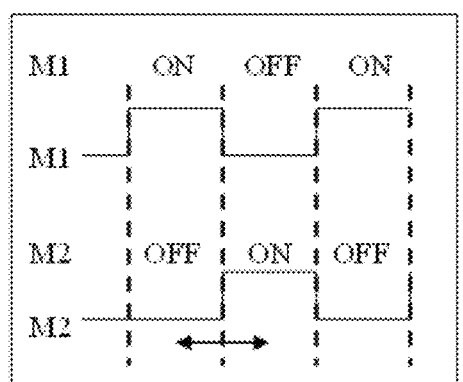
Figure 8C
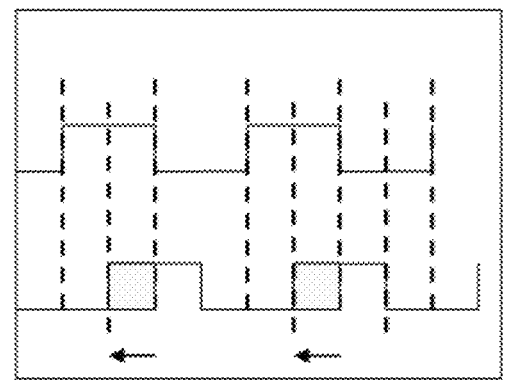
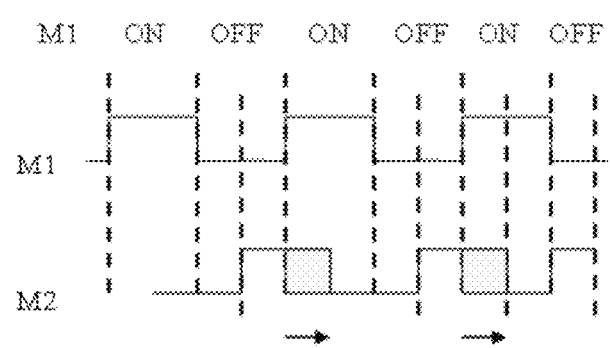
Figure 8D

[D] Non-Overlapping Current

MAGNETIC FLYWHEEL ENERGY MANAGEMENT SYSTEM AND METHOD

CROSS REFERENCE TO RELATED APPLICATIONS

This application is the US national phase filing of, and claims the priority benefit of, PCT application PCT/US2017/060715, filed Nov. 8, 2017, the entire contents of which are incorporated herein by reference.

BACKGROUND OF THE INVENTION

Field of the Invention

This invention is in the field of electrical energy storage and generation devices.

Description of the Related Art

Buildings and other facilities require substantial amounts of electrical power, often at least 50 kilowatts, 100 kilowatts, or more. Although traditionally, such buildings are often supplied by commercial power plants through the standard electrical grid, such power is not always consistent. Electrical power from the grid is typically subjected to non-uniform pricing, where some hours of the day or days of the week are subjected to extra charges. Additionally, transient interruptions can occur. Thus there is a high interest in systems that can provide more uniform electrical power at lower costs.

Although alternative energy sources, such as photovoltaic solar cells, storage batteries, and the like are commonly used, such systems are not without their own problems. Solar cells, of course, can rapidly lose power in the presence of clouds and rain, and are of course useless at night. Storage batteries, although improved in recent years, still suffer from a limited number of charge and discharge cycles, as well as a limited ability to provide very high amounts of power. Thus improved methods to manage electrical energy are desirable.

Flywheel energy storage methods are known in the art. However due to various limitations, such flywheel energy storage systems have not become popular.

BRIEF SUMMARY OF THE INVENTION

The invention is based, in part, on the insight that further improvements in the art of flywheel design for electrical energy storage and generation could help overcome some of the limitations of present designs. In particular, improved methods of managing how power is applied to such flywheels, how power is tapped from such flywheels, and alternative flywheel designs are disclosed herein.

In some embodiments, the invention may be an energy (e.g. electrical energy) management device. This will in turn be comprised of at least one rotary flywheel electric energy management device comprising two shafts that are connected together to form a single composite shaft. Each individual shaft will typically comprise a smaller circumference end and a larger circumference end. The smaller circumference ends of these shafts are typically suspended on low friction bearings, preferably magnetic bearings. These two individual shafts are configured to join together at their larger circumference ends to form at least one cavity that encases a flywheel mass. This flywheel mass will typically be of substantial weight, usually in excess of 100 pounds, such as 400 pounds or more, and the radius of the flywheel will often be on the order of a foot or more, such that at high rotational speeds, the flywheel can store a substantial amount of rotational kinetic energy.

This flywheel mass will typically comprise a plurality of permanent magnets arranged so that the magnetic poles of these magnets are either disposed along the axis of rotation of the flywheel (axial configuration) or are disposed along the radius of the flywheel (radial configuration).

These shafts are typically further surrounded by or are in contact with at least one stator. This at least one stator will typically comprise a plurality of magnetic pickup coils arranged and electrically connected in a stator configuration, and configured so the shafts and the corresponding flywheel mass can rotate freely within or next to each at least one stator. The various magnetic pickup coils and the at least one stator are typically further configured so that when the flywheel mass rotates, changing magnetic fields from the high speed movement of the plurality of permanent magnets causes electrical current to flow within the various magnetic pickup coils and thus through the at least one stator as well. The invention will typically also comprise at least one electric motor (which in some configurations may also function as an electrical generator) that is configured to apply torque, often via magnetic coupling, to at least one smaller circumference end of at least one said shaft. This torque is used to spin the shaft and the flywheel mass to high rotational speeds, often thousands of rotations per minute (RPM) or more.

Each of the one or more rotary flywheel electric energy management devices used in the invention may be further configured to store input electrical energy as flywheel rotational kinetic energy, and to convert said flywheel rotational kinetic energy into output electrical energy, according to the methods described herein.

In some embodiments, the invention (system) may be used in a smart-grid interactive kinetic energy generator and storage device, system and method. More specifically, in some embodiments, the invention may be a device, system and method for maximizing the efficiency and operations of electric motors of various kinds, connected both in series and in parallel. Although not intended to be limiting, as a specific example of how the invention may be used, various building (facility) electrical power management examples will often be used.

The system may further employ interleaved motor and generator combinations that may use magnetic bearings, multifilar windings, and back EMF collection systems to efficiently provide electrical power under a variety of rapidly changing power supply and demand conditions.

In some embodiments, the system may also use microprocessors, custom software algorithms, and programmable electronic control systems to monitor and command all aspects of power supply, duration and timing between multiple stators on multiple motors, as well as between multiple stators on multiple generators.

In a preferred embodiment, the invention's software algorithms work with the invention's hardware to adjust supply to demand in real time wherever the load is located, or wherever generators are located. The system can also rapidly adjust demand loads to supply availability if conditions warrant such actions.

The invention described herein can further comprise a single motor powering a device, a generator supplying electricity, or it can also comprise multiples of such motors and generators. The combination of motor and generator, as described herein, is occasionally termed a "genset".

In some embodiments, the invention's gensets can be connected together (in series, parallel or series-parallel) to supply sufficient electricity to power an entire facility's varying electrical load. In some embodiments, a number of gensets can be configured in numerous ways to provide redundancy, capacity and availability while ensuring maximum overall system efficiency is achieved.

Additional types of optional associated infrastructure, such as energy storage systems, tracking systems for solar photovoltaic, panels, cooling pumps, heat-exchangers and devices can also be monitored and controlled using the systems and methods described herein.

BRIEF DESCRIPTION OF THE DRAWINGS

FIG. 7A shows an exploded diagram showing an embodiment of a hollow safety shield.

FIG. 7B shows the dimensions of the safety shield enclosure (704.

FIG. 7C shows additional details of some of the flywheel and safety shield support structures.

FIG. 7D shows an example of the optional vacuum chamber.

FIG. 8A shows an example of a plurality of interleaved motors/generators disposed on the main axis of a flywheel.

FIG. 8B shows an example of where the energy control processor uses non-overlapping operation of the various motor/generators previously shown in FIG. 8A.

FIG. 8C shows an example of where the energy control processor uses trailing edge overlap operation of the various motor/generators previously shown in FIG. 8A FIG. 8D shows an example where the energy control processor uses leading edge overlap operation of the various motor/generators previously shown in FIG. 8A.

DETAILED DESCRIPTION OF THE INVENTION

Figure 1A:
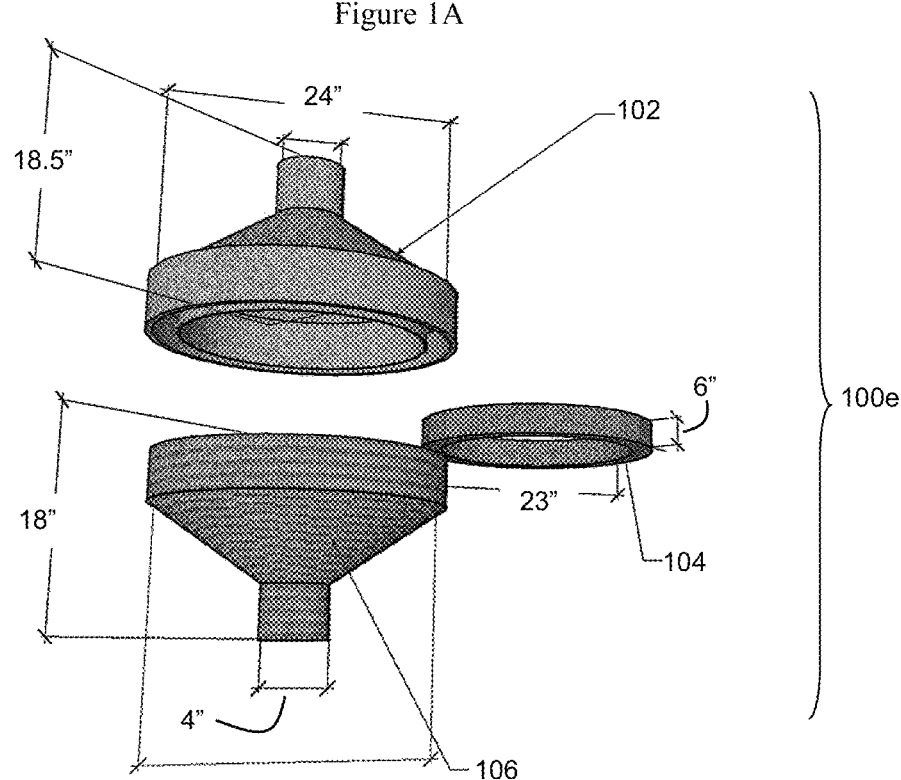
FIG. 1A shows an exploded diagram of the moving portion of the flywheel.

As previously discussed, in some embodiments, the invention may be an energy management device, system or method. The invention often uses one or more rotary flywheels, however in some embodiments, the flywheel is optional and need not be used. For example, the invention may comprise at least one (and sometimes two or more) rotary flywheel electric energy management device, comprising two connected shafts. Each of these shafts comprises a smaller circumference end and a larger circumference end. As will be discussed shortly, various types of shaft designs are possible. Examples of such flywheels are shown in FIGS. 1A-1C, FIG. 2, FIG. 3, and FIGS. 4A-C, Each of the smaller circumference ends of the two shafts are typically suspended on low friction bearings, preferably magnetic bearings, as shown in FIG. 5 and elsewhere. As shown in FIG. 1A, the two shafts (or the two ends of the combined connected shaft) are configured to join together at their larger circumference ends to form at least one cavity that encases a flywheel mass. In a preferred embodiment, the shafts and flywheel are held in a vacuum chamber, as shown in FIG. 7D (alternatively, a chamber filled with gas with a lower viscosity than air, such as helium may also be used).

FIG. 1A shows an exploded diagram of the moving portion of the flywheel (100e) showing the two flywheel shafts (102 and 106), each having a smaller circumference end and a larger circumference end. The two flywheel shafts join together to form a cavity, with at least one flywheel mass (104) configured to fit into this cavity. In this embodiment, the two flywheel shafts are substantially conical hollow shafts (which can be made from a composite material such as a carbon fiber based composite material, or other type composite material), and the two shafts are configured to join together at their larger circumference ends. In this example, the flywheel mass is a solid steel alloy ring (magnet cavities not shown), with radius of about 1 foot, and a height of about six inches, weighing about 400 pounds. The smaller circumference end has a radius of about 2 inches. Each conical shaft has a total height of about 18 inches, and the conical portion of the shaft tapers from a first radius of about 1 foot to a second radius of about 2 inches over a height of about 1 foot.

In this embodiment the alloy steel ring flywheel mass (104) is encased on three sides in one conical flywheel shaft, and then that conical flywheel shaft is then encased inside of the other (somewhat larger "larger circumference end" conical flywheel shaft. The two conical flywheel shafts and the ring shaped flywheel mass are then bonded together to form the entire moving portion of the flywheel.

Figure 1B:
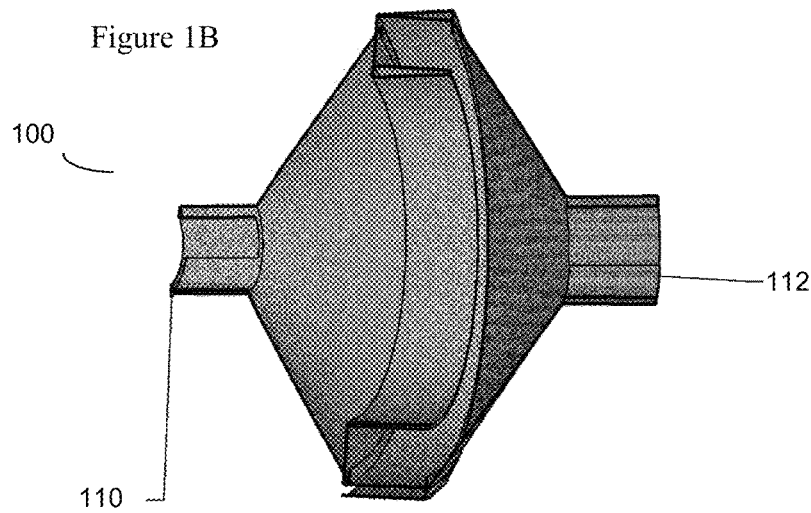
FIG. 1B shows a non-exploded partial cross section of the flywheel.

FIG. 1B shows a non-exploded partial cross section of the flywheel (100), showing the two flywheel shafts joined together to encase the flywheel mass. In some embodiments, magnets (110) may be mounted on at least one smaller circumference end of the flywheel shafts to for various purposes, such as use with low friction magnetic bearings, magnetic coupling to axially mounted drive motors, generators, clutches, and the like. In some embodiments, drive flanges (not shown) may also be mounted on at least one smaller circumference end of the flywheel shafts (112).

Figure 1C:
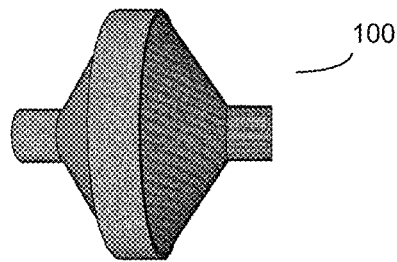
FIG. 1C shows an alternate view of the flywheel (100) previously shown in FIG. 1A and FIG. 1B.

FIG. 1C shows an alternate view of the flywheel (100) previously shown in FIG. 1A and FIG. 1B.

If a vacuum chamber or lower viscosity gas is used, the entire flywheel housing is often encased in a vacuum or otherwise sealed chamber. In some embodiments, the flywheel shafts may be driven magnetically via chamber wall cut outs, as per FIG. 7D (728) (e.g. regions of the chamber wall made with a magnetically permeable material such as glass) that allows for magnetic coupling between the flywheel shaft and the shaft of the motor(s) used to drive the flywheel shafts.

In some embodiments, a magnetic clutch between the motor shaft and the flywheel shaft inside the vacuum chamber (via the side glass portal/magnetic windows 728) may be used. Such a clutch allows for improved energy management techniques. For example, the clutch can be engaged or disengaged under processor and software control. This automatic engagement and disengagement technique allow the motor to automatically disengage from the flywheel shaft, and the flywheel turn freely, as appropriate to present energy needs, and then automatically engage again when needed.

As will be discussed in more detail shortly, in some embodiments, the invention may further comprise a battery storage system device and an energy control processor. This energy control processor(s), along with suitable software, can be used to control many aspects of the system. Suitable processors include the popular x86 series of microprocessors, ARM processors, MIPS processors, along with processor memory and interface circuitry.

This energy control processor may be used for various embodiments of the invention. For example, in some embodiments, the invention's energy management device may comprise plurality (e.g. 2 or more) rotary flywheel electric energy management devices. Here, these can all be multiplexed together under the control of the system's energy control processor(s). For example, the energy control processor can be configured to adjust which rotary flywheel electric energy management device stores input electrical energy as its flywheel rotational kinetic energy, and which rotary electric energy management device converts its flywheel rotational kinetic energy into output electrical energy. The processor can perform this adjustment as a function of changing power supply and power demand conditions.

More sophisticated control schemes are also possible. In one example, which is useful in the multiple rotary configurations described above, and other embodiments where multiple motors and generators are used, the control processor can employ interleaving methods. Here the energy control processor can be configured to store input electrical energy as flywheel rotational kinetic energy to each different rotary flywheel energy management device in an interleaved manner. Much like how a multiple cylinder piston engine interleaves the action of the sparkplugs in each engine cylinder, the processor can first direct input energy to a first rotary flywheel energy management device, and then (possibly only a fraction of a second later) direct input energy to a second rotary flywheel energy management device, and so on.

In other embodiments, the energy control processor can be configured monitor electrical power demand, and to disconnect the electric motors from the battery storage system during periods of low electrical power demand. The energy control processor can be further configured to monitor the speeds of rotation of the flywheel shaft(s), and to reconnect the electrical motors to the battery storage system when the speeds of rotation of these flywheel shafts drop below a preset criteria.

In some embodiments, when there are more than one rotary flywheel electric energy management devices, these flywheels may be are configured to be connected together to form at least one common rotational shaft.

Further in some embodiments, at least some of the rotary flywheel electric energy management devices may be configured to be connected or disconnected from at least one common rotational shaft with a clutch controlled by the system's energy control processor(s).

Various flywheel shaft configurations are possible. In some embodiments, it is useful to shape both flywheel shafts in a conical shape, which mesh together at their larger diameter ends. The flywheel shafts are preferably formed using high strength materials, such as composite carbon fiber over steel materials. This is because at high rotational speeds, flywheels attempt to fly apart at the edges. Here, use of conical shapes and reinforced materials both helps alleviate this problem, and also allows for still higher rotational speeds, thus allowing the flywheel to store a greater amount of rotational kinetic energy.

In this embodiment, the invention's improved conical flywheel shaft design connects onto the flywheel up near the larger outer diameter of the shaft. This is in contrast to prior art designs, which tended to employ a non-conical round (cylindrical) shaft connected at the lower diameter center of the flywheel.

By connecting at the outer ring or edge of this conical design, the "wobble" effect often experienced by prior art standard center shaft flywheel designs can be reduced. In this wobble effect, the outer diameter of the flywheel slightly wobbles towards and then away from the magnets installed in the outer rim. This induces unfavorable effects in prior art flywheel pickup coils, such as distortion and backlash effects, which reduced the efficiency of prior art designs. The invention's improved conical shaped flywheel design helps resolve this problem.

Another advantage of the conical rotor shaft embodiment is that the larger outer diameter of the flywheel (where the various permanent magnets are disposed) will move more rapidly (due to the larger radius at this region of the shaft) than the smaller radius portion of the flywheel shaft. This produces a gear-like step up function, without the maintenance issues associated with gear type designs. (e.g. gear teeth wear creating sloppy torque, gearboxes needing maintenance, etc.)

Arrangement of Magnetic Pickup Coils

For safety (since flywheels can occasionally fall apart at high speeds), often the flywheel mass and the various flywheel stators are further surrounded by at least one safety shield. In some embodiments, the magnetic pickup coils in the stator may be either arranged in an outer ring of a flywheel safety shield, or in between the flywheel and any flywheel safety shield.

As an example, in some embodiments, the flywheel mass may be arranged in a ring like shape with a radius of about 1.5 feet. In such an embodiment, a large number of magnetic pickup coils, such as 70+ magnetic pickup coils, may be used. Although many of these magnetic pickup coils may be used in the stator, other magnetic pickup coils may be used for other purposes, such as to help provide torque on the flywheel, help guide the motion of the flywheel to reduce problems of tilt and wobble, and the like.

Figure 2:
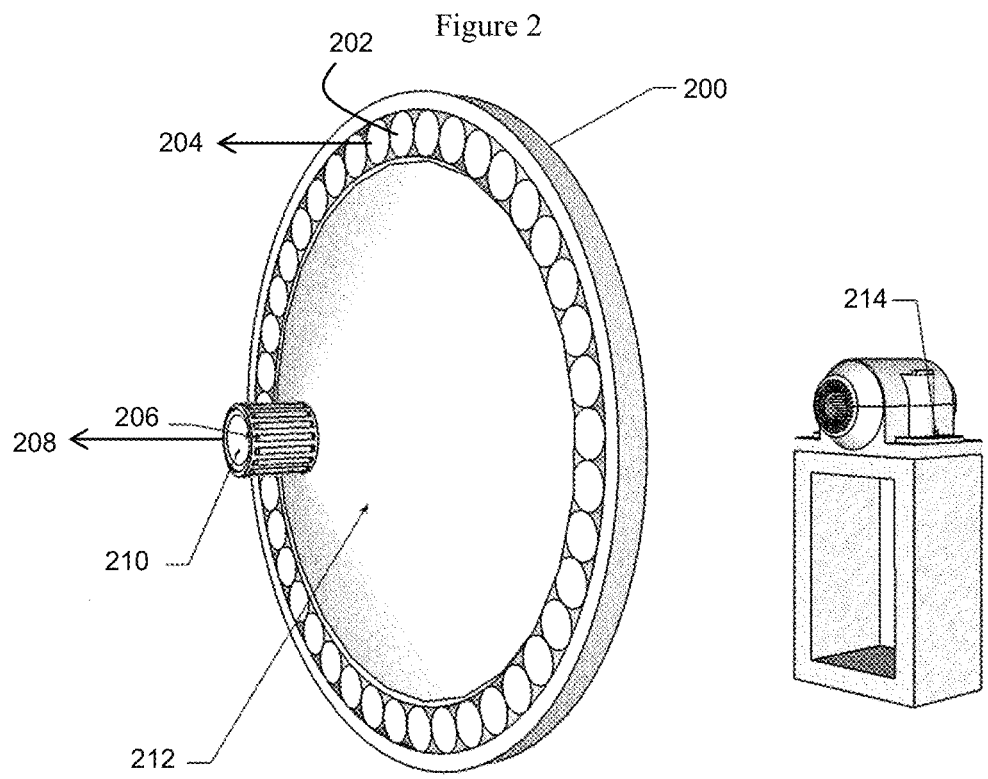
FIG. 2 shows a detail of an alternate version of the flywheel assembly.

FIG. 2 shows a detail of an alternate version of the flywheel assembly (200), showing how in this embodiment, the flywheel mass is primarily composed of a plurality of permanent magnets (202), here all arranged in an axial configuration where the axis of the magnet's magnetic pole (204) is arranged parallel with the axis of rotation of the flywheel (208). In this embodiment, a plurality of shaft magnets (206) are also embedded in the smaller circumference end of the flywheel shaft (210), and can be used in conjunction with magnetic bearing (214). In this embodiment, essentially the entire shaft (212) comprises carbon fiber.

Figure 3:
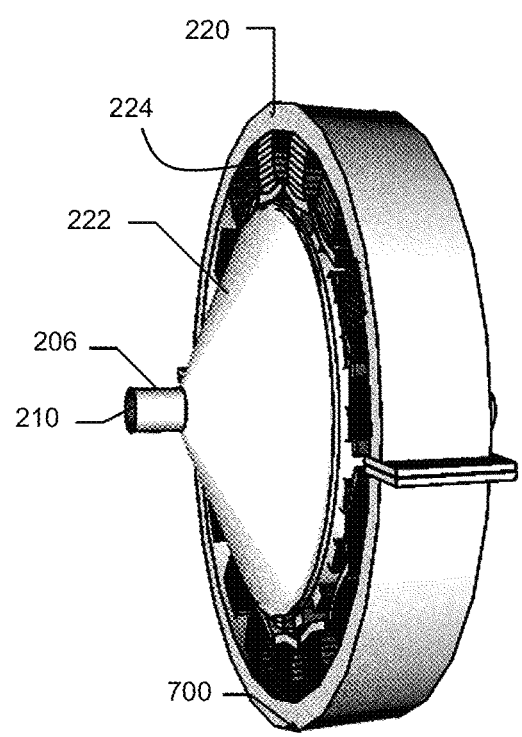
FIG. 3 shows a detail of the flywheel shaft from FIG. 2, here surrounded by a hollow stator comprised of a plurality of magnetic pickup coils (224) arranged and electrically connected in a stator configuration.

FIG. 3 shows a detail of the flywheel shaft from FIG. 2, here surrounded by a hollow stator comprised of a plurality of magnetic pickup coils (224) arranged and electrically connected in a stator configuration. In this embodiment, this stator further is a component of a safety shield (700). Here the various permanent magnets (202) previously shown in FIG. 2 are hidden by the various magnetic coils. However when the flywheel mass rotates, the changing magnetic fields from the plurality of permanent magnets (202) cause electrical current to flow within the plurality of magnetic pickup coils (224).

The flywheel mass, often set into the outer cavity of the flywheel shaft, can be a full 360-degree ring, or various smaller components. For example, the flywheel mass may be composed of a plurality of masses, often placed equally spaced along the perimeter of the outer cavity.

In a preferred embodiment of the invention, a plurality of high power rare earth (e.g. neodymium) magnets are disposed in the flywheel mass. The flywheel is often further enshrouded with a safety shield. Various sets of magnetic pick up coils are disposed all around the 360-degree periphery of this shroud, or alternatively embedded in this shroud. As the motor spins the flywheel, the flywheel magnets fly closely past these magnetic pickup coils. This changing magnetic field induces a current within the pickup coils. This produces electricity. The electricity can be used for various purposes, and can even be used to charge a battery storage system that powers the flywheels' motor power. This battery will be discussed in more detail shortly.

Put alternatively, the flywheel mass will typically comprise a plurality of permanent magnets arranged in any of an axial or radial configuration. As previously discussed, an axial configuration is when the magnetic poles of these magnets are disposed along the axis of rotation of the flywheel (axial configuration) and a radial configuration is when the magnetic poles of the magnets are disposed along the radius of the flywheel.

Figure 4A:
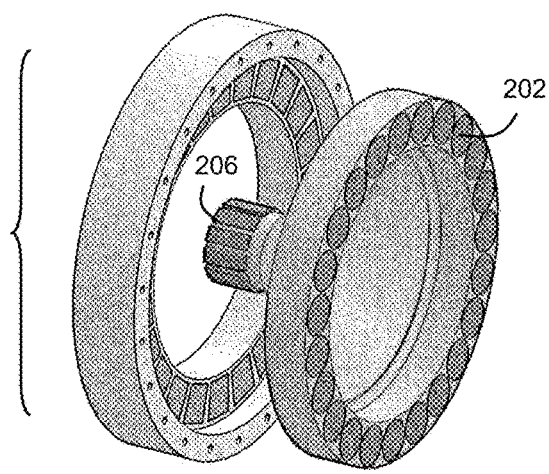
FIG. 4A shows an exploded diagram of a portion of a flywheel and stator arrangement.

FIG. 4A shows an exploded diagram of a portion of a flywheel and stator arrangement, similar to that shown in FIGS. 3 and 4. The permanent flywheel magnets are shown as (202), and the permanent shaft magnets are shown as (206).

Figure 4B:
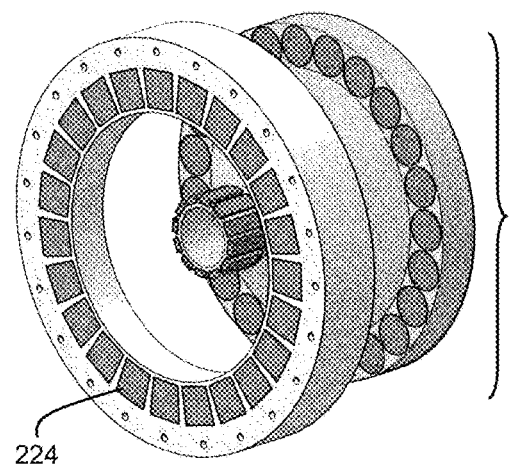
FIG. 4B shows an alternate view of an exploded diagram of a portion of a flywheel and stator arrangement.

FIG. 4B shows an alternate view of an exploded diagram of a portion of a flywheel and stator arrangement, similar to that shown in FIGS. 3 and 4. The magnetic pickup coils are shown as (224).

Figure 4C:
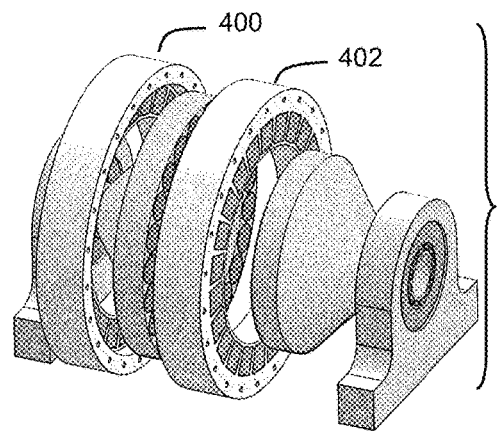
FIG. 4C shows an alternate view of an exploded diagram of a portion of a flywheel and stator arrangement.
Figure 5:
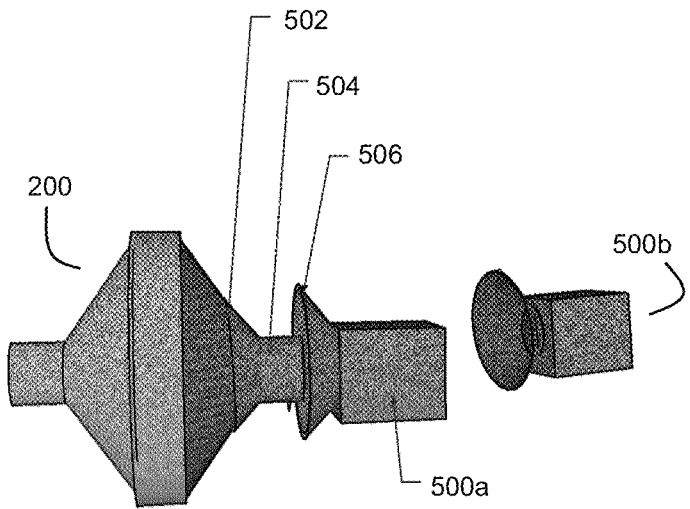
FIG. 5 shows an embodiment of a magnetic bearing (500a), shown attached to a flywheel (200), and detached from the flywheel as (500b).

FIG. 4C shows an alternate view of an exploded diagram of a portion of a flywheel and stator arrangement. Note that in this embodiment, there are two stator arrangements (400) and (402).

Figure 4D:
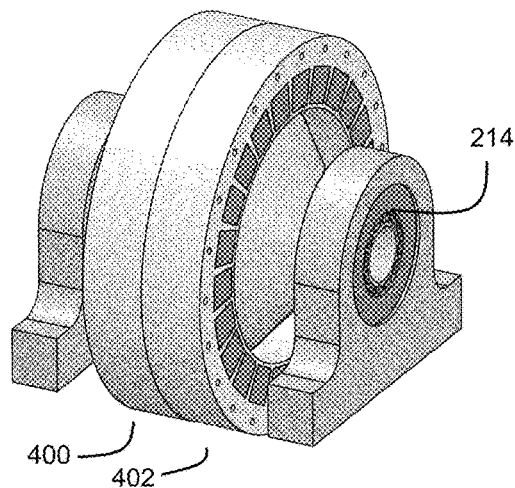

FIG. 4D shows a regular view of the device previously shown in FIG. 4C, showing how the two stators (400) and (402) are arranged. A magnetic bearing (214) is also shown.

These permanent magnets can disposed on the outer surface of the flywheel mass, or they can be embedded into the inner surface of the flywheel mass. Although the flywheel magnets and plurality of magnetic coils can be used to produce electrical power (e.g. can function as a generator as desired), other generators, such as axially mounted generators, can also be used to convert the flywheel rotational kinetic energy into electrical energy as desired.

The permanent magnets can be any of various different shapes, including round, rectangular, or other types shapes that is generally configured to give off a magnetic field most beneficial for coupling the maximum amount of energy into the magnetic pickup coils. Although often all of the magnets will be installed with a similar magnetic pole orientation (e.g. all magnets have north poles configured to face the magnetic pickup coils), other pole orientations are also possible (e.g. alternating north and south orientations, etc.) depending on the magnetic pickup coil winding pattern and desired function of the system.

The flywheel shafts are typically further surrounded by or positioned close to at least one stator. This stator will typically comprise a plurality of magnetic pickup coils arranged and electrically connected in a stator configuration. This at least one stator is configured so that the flywheel shafts can rotate freely within the at least one stator.

These magnetic pickup coils and the one or more stators are configured so that when the flywheel mass rotates, the changing magnetic fields from the various permanent magnets causes electrical current to flow within the various magnetic pickup coils and stator(s).

To spin up the flywheel, and in some embodiments also to further draw energy from the flywheel, in some embodiments at least one electric motor (or electric motor/generator) is further configured to apply torque, preferably via magnetic coupling, to at least one of the flywheel shafts (e.g. at least one smaller circumference end of at least one flywheel shaft to spin the flywheel shaft and the flywheel mass up to high speeds, usually in excess of 1000 RPM, such as 6000 RPM (6 KRPM) or greater. This can be a brushless DC motor (BLDC Motor) or other type electric-motor or motor/generator.

As will be discussed in more detail shortly, each one of the one or more rotary flywheel electric energy management devices are typically further configured to store input electrical energy as flywheel rotational kinetic energy, as well as to convert the flywheel rotational kinetic energy into output electrical energy.

Although not essential, in a preferred embodiment, the flywheel shafts, flywheel mass, the flywheel stator(s) are preferably disposed within a vacuum chamber or a chamber filled with a low viscosity gas such as helium (here also called a "vacuum chamber"). The invention will also preferably employ low friction magnetic bearings that are also disposed within this vacuum chamber.

In some embodiments, each at least one smaller circumference end of the flywheel shaft will also comprise a plurality of shaft magnets. In these embodiments, for each rotary flywheel electric energy management device, the at least one electric motor may be configured to use these shaft magnets to apply torque to said the flywheel via at least one smaller circumference end(s) of the combined flywheel shaft, causing at flywheel shaft to spin.

As previously discussed, although conical flywheel shafts are not essential, they are preferred. In a preferred embodiment, each flywheel shaft (i.e. each half of a combined flywheel shaft) is a substantially conical hollow shaft, and joins together with the other conical hollow shaft to form a combined conical hollow shaft. In a preferred embodiment, these conical hollow shafts comprise carbon fiber, the various permanent magnets will comprise rare earth permanent magnets, and the flywheel mass comprises a mass of over 100 pounds, such as 400 pounds or more.

In this embodiment, a "hollow" and light weight conical shaped flywheel shaft, often made from a light weight yet sturdy carbon fiber mesh composite material over a base steel structure, can be used. The two different shafts need not have exactly the same larger outer diameter. Rather a first conical shaft may have a largest outer diameter, and a second conical shaft may have a smaller large outer diameter and be configured mesh with the first conical shaft, forming an inside cavity disposed along the outer perimeter of the combined flywheel shafts. A heavy flywheel mass, such as a 400 pound mass, such as a steel ring (often with embedded permanent magnets) may be disposed inside this cavity. Alternatively the flywheel mass may be made of other materials, and need not be formed from one continuous material, but instead may be a plurality of different flywheel masses. This flywheel mass has the main function of being the main mass used to store rotational kinetic energy when the flywheel is spinning. It can also additionally (and optionally) help serve as a support structure to hold the various permanent magnets.

FIG. 5 shows an embodiment of a magnetic bearing (500a), shown attached to a flywheel (200), and detached from the flywheel as (500b). In this embodiment, angled shaft magnets are placed on the cone of the flywheel shaft (502), and shaft magnets are also placed on the smaller circumference end of the flywheel shaft (504). The magnetic bearing (500a, 500b) has its own set of magnets that repel shaft magnets (502 and 504), thus allowing the flywheel to "float" and turn on the magnetic bearing with almost no friction.

Figure 6:
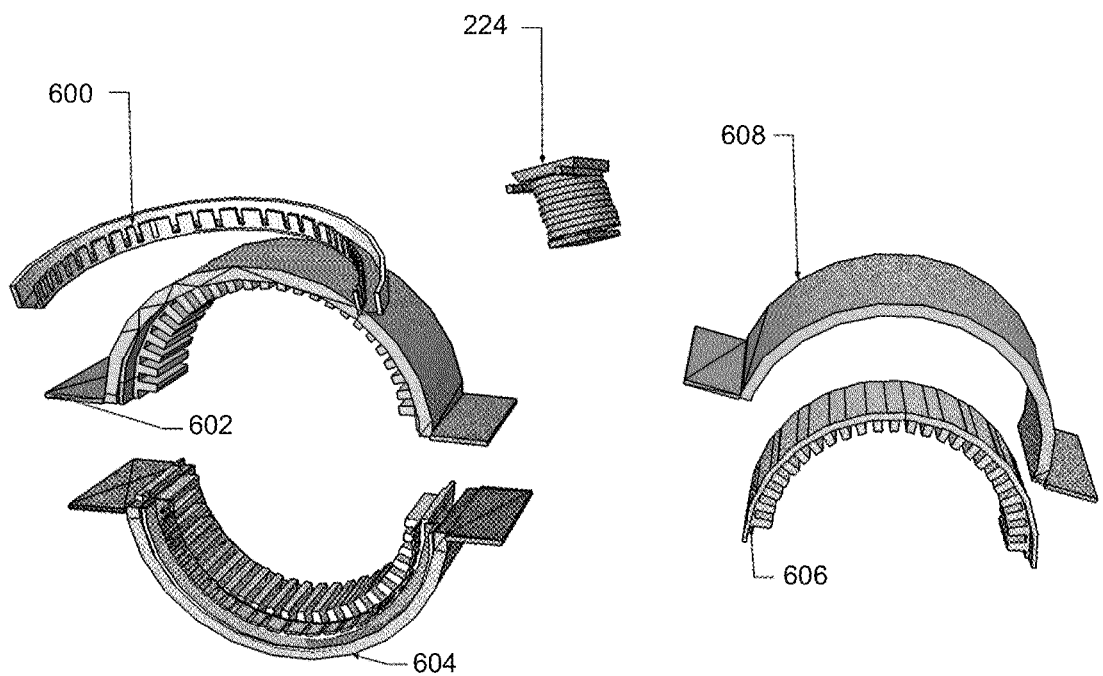
FIG. 6 shows additional details of the stator (220).

FIG. 6 shows additional details of the stator (220). The stator often further comprises coil wire guides (600) in addition to the magnetic pickup coils (224). The stator segments are formed into a half circle (606). Here the stator comprises a top and bottom half circle portion that when joined form the complete stator circle (602). The magnetic pickup coils, used as the stator coils, the coil wire guide, are shown installed in the outer stator in (604). The outer stator surface, which in some cases may also be configured as a hollow safety shield, is also shown (608).

FIG. 7A shows an exploded diagram showing an embodiment of a hollow safety shield. In this embodiment, the safety shield (700) can be formed from two identical half sides. For further protection against "rapid unscheduled disassembly", the safety shields may be formed from impact resistant materials, such as Kevlar® (aramid) fibers. (Kevlar is a trademark of E. I. du Pont de Nemours and Company). A bearing assembly (702) and drive flange (704) are also shown.

FIG. 7B shows the dimensions of the safety shield enclosure (704), which is roughly 30 inches high, 30 inches wide, and 30 inches deep, and various support structures (706, 708) are also shown.

FIG. 7C shows additional details of some of the flywheel and safety shield support structures (706, 708)

FIG. 7D shows an example of the optional vacuum chamber, where the flywheel shafts, flywheel mass, and flywheel stators (and sometimes the safety shield enclosures) may be disposed. The inside of the vacuum chamber door panel is shown in (720). This door may further comprise a flange (722) with multiple holes for threaded fasteners, and gaskets (724a, 724b) to maintain a vacuum seal. The chamber walls (726) can either simply be thick enough to withstand air pressure, or alternatively may be additionally armored and the chamber itself can serve as a safety shield. In some embodiments, the vacuum chamber may contain either magnetically transparent ports (728) to assist in magnetically coupling external clutches, motors, generators and the like to the flywheel shafts. In other embodiments, these ports (728) may be configured to accommodate drive flanges such as (704).

Although there are some energy losses, much of the energy that may have originally been drained from this battery system to drive the flywheel can be recouped. This recouped energy can then be sent back continuously (sometimes called "self-looping") to (in conjunction with extra energy needed to compensate for energy loss) help keep the battery storage system topped up and at full charge at all times. This helps the battery system (to be discussed) last longer, and also improves battery efficiency.

As previously discussed, in some embodiments, the flywheel's entire shaft may be fitted with magnetic wheels on the right and left sides, and this entire flywheel assembly is then encased inside a vacuum sealed housing that has glass windows or other magnetically permeable material "magnetic windows" on opposite sides of the chamber. These "magnetic windows" can then be used to magnetically couple torque from an outside motor or generator through to the flywheel itself, while still keeping the chamber's airtight seal intact.

Note further that in some embodiments, the invention will further at least one generator coupled to at least one smaller circumference end of at least one flywheel shaft. Because this generator is mounted on the axis of the flywheel shaft, it is here termed an "axial generator". Note that this "axial generator" can operate in one mode as an electrical motor to drive the flywheel shaft, and in a different mode to obtain electrical energy from the rotation kinetic energy of the flywheel shaft. Thus the same generator/motor device or motor/generator device can perform both functions.

Further Discussion

Operating modes: In some embodiments, the flywheel may be operated continually. Unlike most uninterruptable power supplies, which only kick on to generate electricity off a battery bank source when the grid goes down, the invention's flywheel may always be operating, and power may always be drawn from the invention's flywheel.

Here, to power the system, the invention's flywheel and battery system can be constantly drawing power from various sources, such as the grid, solar energy, or electrical energy. If one power source drops off, the flywheel and battery can continue to supply power without interruption, and can to some extent make up for the lost power for a limited amount of time while other power sources are brought online. Additionally, the invention can also draw power from the grid during times of cheap grid power, and supply power during times of higher grid power rates. In this sense, the invention can be configured to perform a type of energy arbitrage—using the grid power to top up the system battery and flywheel at nighttime cheap rates, and then providing power during times of more expensive power.

Interleaving Techniques

In some embodiments, the invention may be configured so that one or more motors use input electrical energy to spin the flywheel, which stores this input electrical energy as rotational kinetic energy. When the flywheel is at a desired rotational speed (RPM), the motor(s) can be temporarily disengaged and the flywheel continues to spin due to rotational inertia.

In these embodiments, the flywheel may also be attached to a standard (e.g. axially mounted) generator that stays connected to the spinning flywheel. This axial mounted generator can use this rotational kinetic energy to provide a desired amount of output power so as, to example, meet a building's electrical loads (energy needs).

This generator imposes torque on the flywheel, and as rotational kinetic energy is removed from the flywheel, it will start to slow down. To keep the output power levels from dropping, detectors for rotor speed (RPM) and output power can be used to determine the exact time to re-engage the motor to the flywheel, to again spin the flywheel up to the desired speed (RPM). This maintains the proper energy output (e.g. building loads in a building/facilities example).

When the flywheel starts to slow down the generator will produce less energy, so to maintain the building power levels we have detectors for velocity position and output power to determine exact time to re-engage the motor to the flywheel to spin its speed back up sufficient to provide sufficient generator output for the building loads as well as the flywheel coils providing sufficient feedback "self-powering" to the input battery source to keep the motor powered as desired for the "set speed control".

The invention's "Interleaved" techniques allow the system keep a steady recharge flowing to the motor's battery. This allows the system to self-loop the flywheel coil energy capture to power the battery, while at same time the flywheel shaft is also connected to a separate axial generator configured to also supply power (e.g. to buildings and the like). So the flywheel typically operates in a continuously spun up manner, passing energy from flywheel electrical input to flywheel electrical output with high efficiency and minimal losses, and at the same time compensating for any interruptions or fluctuations in the input electrical power.

In some embodiments, it is useful to configure the invention with two or more motors attached to the flywheel(s), and to operate the two or more motors in a multiplexed or interleaved manner. This can be done by, for example, pulsing the motor stators in an interleaved fashion, where one pulse is first sent to motor stator 1, and then a second pulse is sent next to motor stator 2. The idea is to direct these power pulses to each motor controller in a rapid "interleaved" fashion, and depend on the inertia of the flywheel to keep spinning as the system switches from a first motor stator to a second motor stator.

At times of low power demand (e.g. low building load, such as after hours), the system processor might intentionally disconnect one or both motors from the system battery in order to conserve battery power. When the flywheel angular velocity (rotations per minute) drops sufficiently low, these motors can then be reconnected and the flywheel spun up again.

Indeed, much like a multi-cylinder internal combustion engine, various motors attached to the same overall flywheel shaft (e.g. a common flywheel shaft) can be pulsed in an interleaved fashion to help insure that the power dawn from the flywheel system is almost exactly the same as the power input into the flywheel system. So the system produces the benefits of a robust uninterruptable power supply system, while at the same time operating at very high efficiency.

That is, each pulse on a given motor produces torque on the flywheel, much like a car piston and cylinder arrangement produces torque on an engine shaft. By pulsing the various motors at proper times, the flywheel shafts can obtain nearly continuous power, and be driven at high efficiency. Here, various processors, digital signal processors, sensors (e.g. Hall Effect sensors), and algorithms may be used to control this interleaving technique.

FIG. 8A shows an example of a plurality of interleaved motors/generators disposed on the main axis of a flywheel, such as either end of the flywheel shaft (smaller circumference ends). This shows how the invention's energy control processor may be configured to apply torque or draw rotational kinetic energy from the rotating flywheel according to a time interleaved scheme where more than one motor or generator is connected to the main axis of the flywheel at the same time. In this scheme, the four motor/generators are simultaneously connected to the same flywheel main axis (smaller circumference ends Here 50% interleaving is shown, using four our motor/generators M1, M2, G1, G2 (800). Two of these are driven as motors (M1, M2, and two are driven as generators (G1, G2). In this example, two motors are driven at 50% power by interleaving methods. One generator G1 can be used to help power the motors, and one generator can be G2 can be configured to supply output power to various loads. An example of 25% interleaving is shown in (802).

FIG. 8B shows an example of where the energy control processor uses non-overlapping operation of the various motor/generators previously shown in FIG. 8A.

FIG. 8C shows an example of where the energy control processor uses trailing edge overlap operation of the various motor/generators previously shown in FIG. 8A FIG. 8D shows an example where the energy control processor uses leading edge overlap operation of the various motor/generators previously shown in FIG. 8A.

Figure 9A:
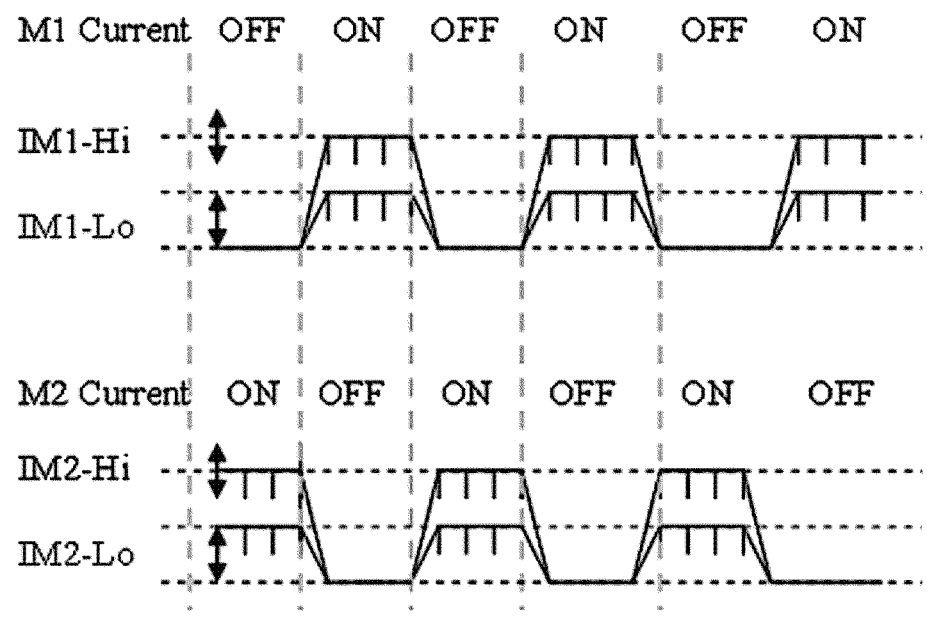
FIG. 9A shows an example where the system's energy control processor(s) is configured to use interleaving techniques where the interleaved motors are also controlled at variable torque.

More specifically, FIGS. 8A-8D show square waves representing "Pulse Periods" times when motors 1 or 2 are enabled to apply current to the motor coils. By contrast, as will be discussed shortly, FIG. 9A illustrates the motor coil current. In FIG. 9A, notice the spikes representing pulses of current. When the motor is enabled, the amount (level) of current can be high-torque or low-torque and each motor can be independently turned on/off to contribute the appropriate amount of torque decided by the main DSP control processor as deemed necessary to keep the building loads powered up to just the exact amount of energy being demanded at the moment.

Thus FIGS. 8A-D show the pulses that drive motor 1 and motor 2 are delivered in an "interleaved" fashion so that the generator output power in the feedback loop never sees more than one motor load at a time (e.g. first motor 1 only, then motor 2 only, then motor 1 only, then motor 2 only). By contrast, as will be shown in FIG. 9A below, FIG. 9A illustrates the "pulsed" motor current for two different torque setting levels. Here I=current, and IM1-Hi shows the motor-1 coil current being driven with the highest current, which is required for motor-1 to produce high torque.

By contrast, the IM1-Lo setting sets the motor coil current lower in order to produce lower torque. Similarly motor-2 can also be set to high or low coil current, hence producing hi/lo torque levels. Notice how in this embodiment, both motor 1 and motor 2 share the same (common) permanent magnet rotor shaft. Here both motors can have independent motor coil current controls, such that each motor can be turned on with slightly overlapping torque contributions with the other motor. Alternatively the motors can be turned on in a manner that is completely separated in time, so that there is no torque overlap, and the generator power feedback loop is only loaded by one motor at a time.

Put alternatively, in some embodiments, a plurality of motors and generators, or a plurality of combination motor/generators, can be configured to share a common shaft. Further, the control processor can be configured to drive this plurality of motors and generators or plurality of combination motor/generators in an interleaved manner.

FIG. 9A shows an example where the system's energy control processor(s) is configured to use interleaving techniques where the interleaved motors are also controlled at variable torque by programming the motor preset current levels to be "higher or lower", thereby enabling each motor to be controlled independently to set the level of torque each motor contributes to the overall aggregate of their shared rotor shaft torque".

Figure 9B:
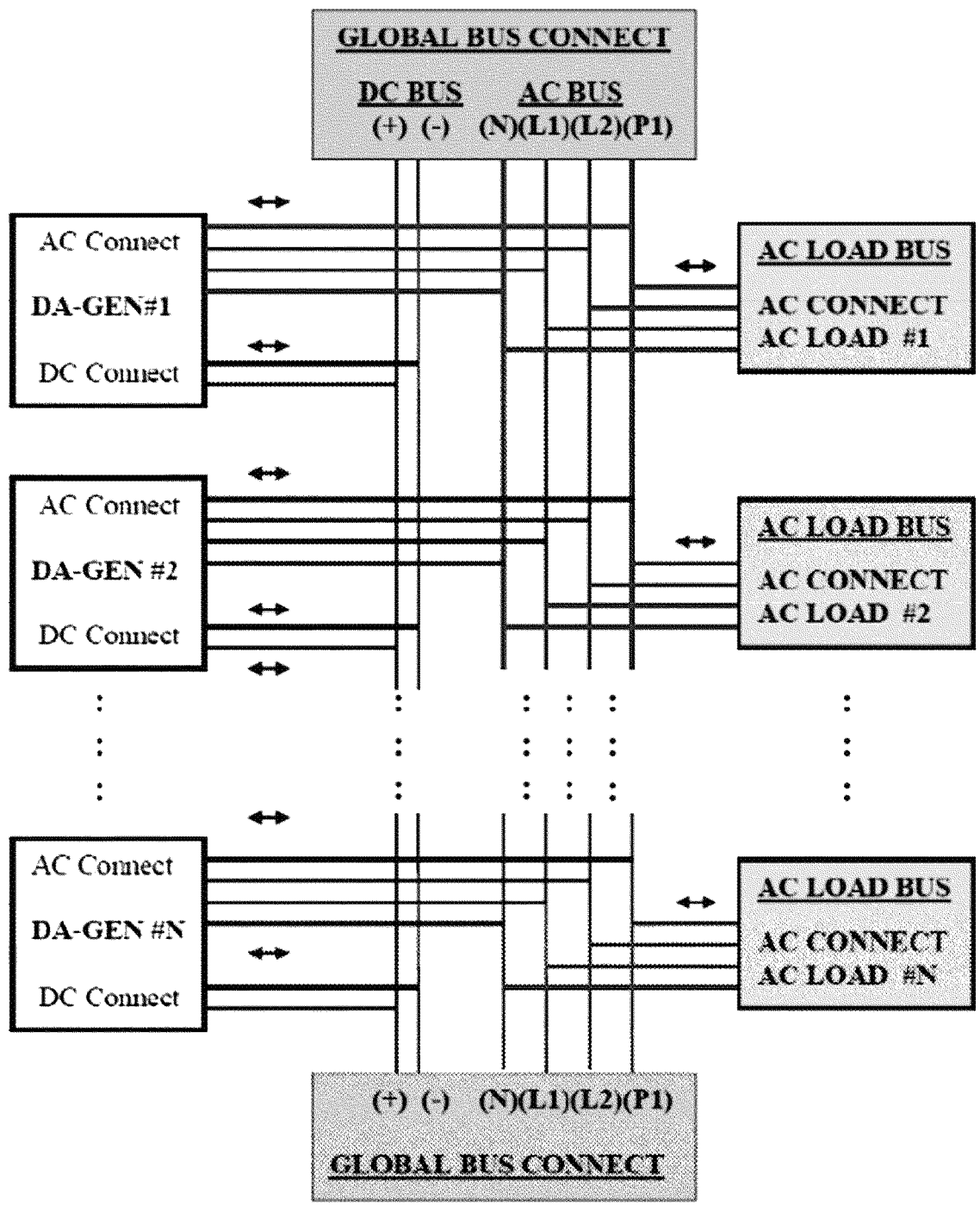
FIG. 9B shows various series and parallel connections for multiple systems and loads.

FIG. 9B shows various series and parallel connections for multiple systems and loads. This shows that in some embodiments of the invention, the energy control processor(s) and software algorithms may be configured to monitor system loads and the state of the charge of the system's battery storage system. This can be used to determine which devices to connect to an AC global bus (e.g. to supply output power), and to supply energy demand in real time. Maximum efficiency may be achieved by adjusting the speed and the torque of the various electric motors and electric motor/generators, and balancing the state of charge of the system's batteries.

More specifically FIG. 9B shows that multiple systems (here alternatively termed DA-GEN systems) can be tied together in parallel to share electrical loads, such as building/facility electrical loads. For example, consider the case where each system has a maximum power output of 50 kW per DA-GEN system and we wish to power a building that requires a total maximum power of 150 kW. Here this can be done by installing three 50 kW DA-GEN systems by wiring their DC & AC buses together in parallel, as is shown in FIG. 9B. Here an energy control processor (e.g. a global "Building Load Share Control Processor") would work to assure that each of the 50 kW DA-GEN systems contributed equal amounts of energy.

As a use example, building lighting normally gets shut off at night, and this may cause the building's power loading to decay from a 150 kW full operating daytime load, to 99 kW (in this example) after hours loading. When this happens, the invention's "Building Load-Share-Control-Processor" will send signals to the invention's various motor controllers to lower the motor's torque levels. As a result, each DA-GEN system would then only need to contribute 33 kW (instead of 50 kW that each system was set to contribute during the daytime load of 150 kW).

Alternative Flywheel Configurations

In some embodiments, the flywheel may comprise two identical half pieces (left & right). These identical half pieces can be sandwiched together to make up a final conical shaped flywheel. This configuration can also encapsulate the flywheel weight and the various permanent magnets.

Although, in some embodiments, clutches (e.g. processor controlled magnetic clutches) may be used to engage and disengage the motor from the flywheel, in some embodiments, the flywheel may always be connected to the motor, in which case no clutch is needed. Here, the system relies on motor driver power controls to determine when the motor is going to apply energy to the flywheel.

Figure 9C:
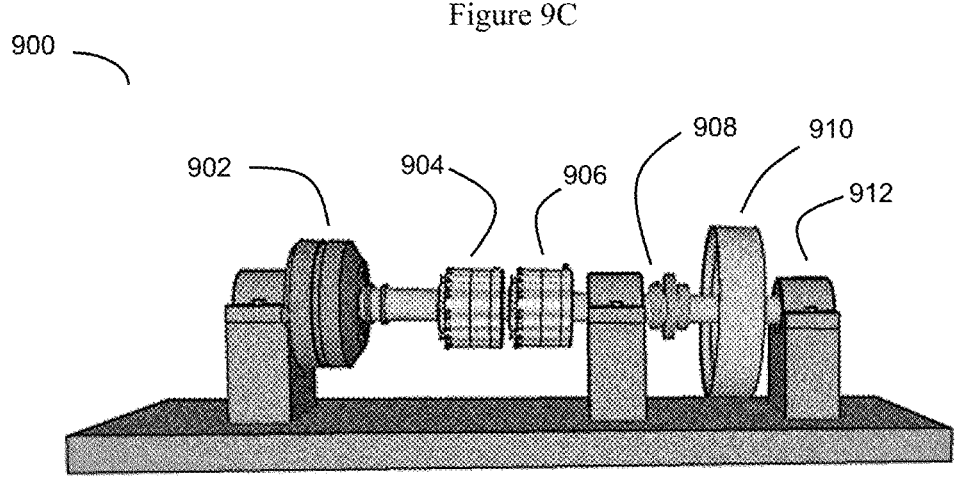
FIG. 9C shows an alternate embodiment of the invention (900) where two motors and one generator are sharing the same shaft.

FIG. 9C shows an alternate embodiment of the invention (900) where two motors and one generator are sharing the same shaft. These are driven by the interleaving methods previously discussed in FIGS. 8B, 8C, and 8D, which drive the motors from a non-overlapping interleaved scheme to a fully overlapping interleaved scheme. Here the generator is (902), the two motors are (904 and 906), the magnetic coupling is (908), an embodiment of the flywheel is (910), and the magnetic bearing is (912).

Figure 9D:
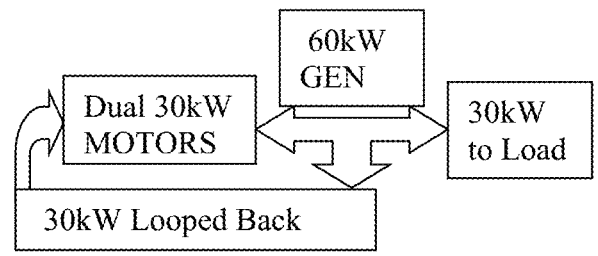
FIG. 9D shows how in some embodiments, the invention can loop-back generator power and feed at least one interleaved motors, such as two interleaved motors.

FIG. 9D shows how in some embodiments, the invention can loop-back generator power and feed at least one interleaved motors, such as two interleaved motors. For example, in one simulation, real-time manufacturing specifications for two identical 30 kW PMBLDC (permanent magnetic brushless DC) motors, and one 60 kW PMBLDC generator (alternator) were used. The motors and the generator were all mounted on a single shaft. Here 30 kW energy output from the 60 kW generator was looped back to provide the two 30 kW PMBLDC motors with sufficient energy to continuously run the system, while the remaining 30 KW of the generator output is used to feed a separate output load.

This scheme thus operates the two 30 kW Motors at a 50% interleaved mode so that their combined torque onto the shaft drives the single 60 kW Generator (here only 30 kW of loop back energy is needed, and the remaining 30 kW from the generator can be used to drive an outside load). Because the rotor has angular momentum, it does not have to be driven every cycle. Here the flywheel adds additional angular momentum to the system. Note however that in some embodiments, the flywheel (910) is optional, and it need not be used.

Figure 10:
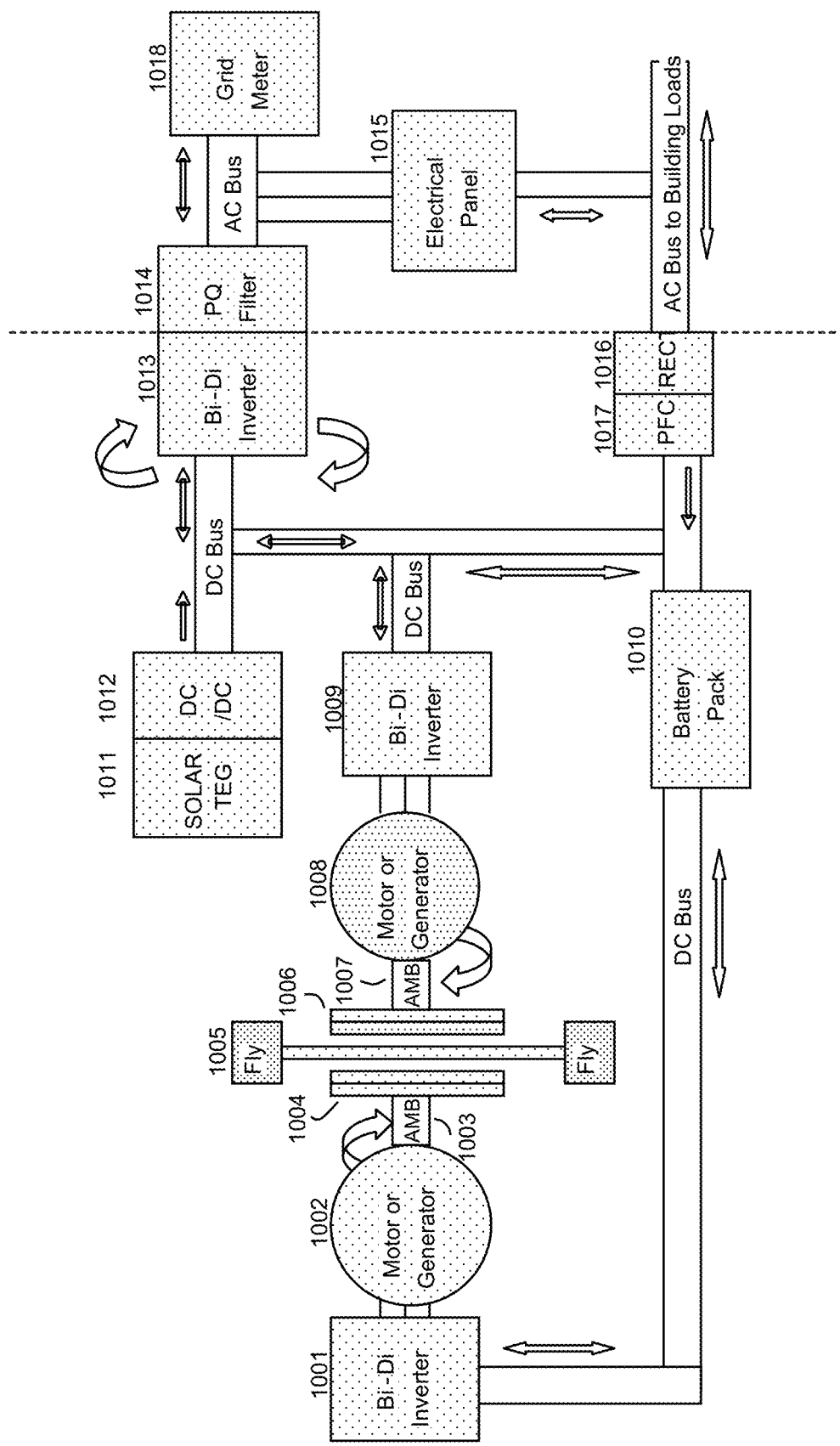
FIG. 10 shows an embodiment of the present invention, here used to help insure a steady supply of electrical power to a building (facility).

FIG. 10 shows an embodiment of the present invention, here used to help insure a steady supply of electrical power to a building (facility). In this diagram, (1001 and 1009) show bi-directional inverters, (1002) shows a BLDC motor generator, (1003 and 1007) show shafts mounted on magnetic bearings, (1004 and 1006) show magnetic clutches, (1005) is the invention's flywheel assembly, and (1010) shows a battery pack. Depending on if the system is consuming or providing electrical power, energy from the DC bus and battery pack (1010) can be transmitted to or received from the AC bus and the building power load via power factor correction device (1017) and AC rectifier (1016).

The system may obtain electrical power from various sources, such as solar power or electrical grid power. Thus (1011) shows an optional solar photovoltaic array or thermal electric generator (TEG), and (1012) shows an optional DC/DC converter for this photovoltaic array. Alternatively the system may obtain power from (or send power to) other sources such as the electrical grid using (1018) other devices, such as power quality filter (1014), bi-directional inverter (1013), electrical panel (1015) and the like.

Thus in this embodiment, the bi-directional inverter (1010) can directly supply the motor/generator (1002) and battery pack (1010) simultaneously if required. In this embodiment, motor/generator (1002) normally drives shaft (1003). This shaft (1003) may be mounted onto magnetic bearings with a magnetic clutch (1004) also connected to the Generator/motor (1008) as shown.

This generator motor (1008) can connect to the Flywheel assembly (1005) which in turn drives the magnetic clutch (1006) and the shaft (1007). This shaft (1007) may also be mounted onto magnetic bearings connected to generator/motor (1008). This generator/motor can also be configured to supply the bi-directional inverter (1009) through a common global DC bus.

In some embodiments, this global DC bus may also be supplied by solar/TEG (thermoelectric generator) panels (1011), often through a DC to DC converter (1012); and/or alternatively through an AC rectifier (1016) via appropriate PFC (Power Factor Correction circuitry) (1017). The global AC bus and electrical panel (1015) may be primarily supplied by a bi-directional inverter (1013) via an appropriate PQ (Power Quality) filter (1014).

In some embodiments, the thermoelectric generator (TEG) may be implemented on the solar photovoltaic panels (solar panels) themselves. Here, for example, the solar panels may be mounted on a metal frame and either coated with a material, or have other fixtures (e.g. thermocouples, heat pipes) that will convert heat from sun into electricity or other useful form of energy. This electrical power can be added to the photovoltaic energy produced by the solar panel. In addition to producing more electrical output, use of such TEG methods can improve the efficiency of the photovoltaic panels. Normally the heat from the sun reduces the efficiency (and therefore the amount of electricity) produced by the photovoltaic panels. Thus use of TEG methods can help cool the frame, and help compensate for the loss in electricity output due to the solar panels being heated by the sun.

The global AC bus and electrical panel (1015) may also be supplied through grid meter (1018) from an external power grid, as a "Net-Metered" connection, such that when the invention's normal collective energy production fulfills a facilities energy loading requirements, the net-metered grid supplied energy connection will be "back-biased-OFF", and no external electricity will be drawn into the facility from this Net-Metered grid connection.

However, if on occasion the invention's collective energy production falls below the amount of energy required by the facility loading, this "Net-Metered" Grid connection will be "forward-biased-ON", and some external electricity will be drawn into the facility through this Net-Metered Grid connection. This external electricity will be used to furnish the balance of the load energy required. When this happens, a "Net-Energy-Deficit" may be recorded by the invention's processor system monitoring software (and this net-energy-deficit can be produced and supplied at a later time).

Alternatively, if on occasion, the invention's collective energy production rises above the amount of energy required by the facility's loads, then this "Net-Metered" grid connection can be "Reverse-biased-ON" and the over produced electricity can be supplied out in the opposite direction through the Net-Metered Grid connection as a "Net-Energy-Excess". This "net energy excess" can be recorded by the invention's processor and system monitoring software as a Credit.

Alternatively, at least a portion of the excess energy production can be directed internally to recharge the system's batteries (1010), and/or to the flywheel energy storage sub-systems.

In some embodiments, a feedback loop of the system's global AC bus that is converted and applied on-to-the Global DC bus can be accomplished via the AC rectifier (1016) and power-factor-correction (PFC) circuit (1017). This can be connected to the facilities loads (often via an AC electrical panel furnished AC power 1015) via the global AC bus. This feedback loop from the global AC bus (1015) can be converted back onto the Global DC bus, thus assuring that electricity will always be available to the invention's motors/generators, even in the absence of system battery charge or flywheel kinetic energy reserves. This helps to provide for an improved level of redundancy and fault tolerance, resulting in enhanced system reliability.

Thus in some embodiments, the invention may further comprise circuitry to convert direct current (DC) to alternating current (AC), as well as circuitry to convert alternating current (AC) to direct current (DC). Further, note that in the above example, the invention was further configured to draw power from an outside electrical grid, and/or to supply power to an outside electrical grid.

Note that although facilities/building examples has been used, the invention can be used for many other purposes as well. As another example, the invention may be further configured to supply energy to any of electric, hybrid, or hybrid electric vehicles by any of cable connections, wireless induction connections, or hydrogen production via electrolysis.

Indeed, in some situations, the invention's flywheel may be mounted on mobile devices, or in buildings that may be subject to earthquake motion, or the like. Here, it may be useful to mount the invention on at least one gimbal to compensate for detrimental effects of varying movement or force applied to the flywheel portion of the invention.

Additional Embodiments

In some embodiments, the invention may be a power management system comprising at least one motor, at least one generator, at least one microprocessor (processor), and at least one software-controlled clutch. The motor may be coupled to at least one generator using at least one flywheel and this at least one software-controlled clutch. The software and processor may be configured to manage interactions between the motor the generator to manage power output in real time. The invention may additionally circuitry that changes direct current (DC) to alternating current (AC) or (AC) to (DC), as well as electrical energy storage devices and kinetic energy conversion devices. The system's software algorithms may be configured to allow real time management of these components to efficiently supply electrical power to external loads.

In some embodiments, the electronic control hardware may be configured to take advantage of the capabilities of electric motors and generators for reducing their energy use and increasing their efficiency while maintaining torque and speed (rpms) at the required levels of output power to assure sufficient energy is always available for an electrical load or loads.

In some embodiments, the processor and associated control circuitry may be configured to allow for multiple paths to and from energized magnetic pickup coils from multiple power sources to multiple loads as required in real time.

In some embodiments, the processor may be configured to control interactions between multiple devices supplying power to an external load or loads.

In some embodiments, the system may additionally employ sensors and bidirectional communication (often digital communication, or wireless digital communication) between the systems various components and devices to enable the system processor to autonomously make predictive decisions based on comparisons with historical data previously collected.

In some embodiments, the system may also obtain input energy from solar energy systems, and make use of the system's geographic location to more accurately manage the solar energy systems to track the position of the sun.

The invention claimed is:

1. An energy management device comprising:
    at least one rotary flywheel electric energy management device comprising two conical shafts;
    each said conical shaft comprising a smaller circumference end with a smaller radius, and a larger circumference end with a larger radius;

each said larger circumference end configured to be hollow;

each said conical shaft configured to taper from said larger radius to said smaller radius so as to form opposite ends of a hollow conical flywheel;

each said smaller circumference ends being suspended on low friction magnetic bearings;

said two conical shafts configured to join together at their larger circumference ends to form at least one hollow conical cavity that encases a flywheel mass;

said flywheel mass primarily comprising a plurality of permanent magnets arranged in any of an axial or radial configuration;

said conical shafts further surrounded by at least one stator comprising a plurality of magnetic pickup coils arranged and electrically connected in a stator configuration, said at least one stator configured so that said conical shafts can rotate freely within said at least one stator;

said magnetic pickup coils and said at least one stator configured so that when said flywheel mass rotates, changing magnetic fields from said plurality of permanent magnets causes electrical current to flow within said plurality of magnetic pickup coils and said at least one stator;

and at least one electric motor configured to apply torque, via magnetic coupling, to at least one smaller circumference end of at least one said conical shaft to spin said conical shaft and said flywheel mass;

each said at least one rotary flywheel electric energy management device further configured to store input electrical energy as flywheel rotational kinetic energy, and to convert said flywheel rotational kinetic energy into output electrical energy; and wherein each conical shaft is a substantially conical hollow shaft, said conical hollow shafts comprise any of a composite material or a carbon fiber material, said permanent magnets comprise rare earth permanent magnets, and said flywheel mass comprises a mass of over 100 pounds.

2. The energy management device of claim 1, wherein said conical shafts, said flywheel mass, and said at least one stator are further disposed within a vacuum chamber;

wherein said low friction magnetic bearings are also disposed within said vacuum chamber;

wherein for each rotary flywheel electric energy management device, at least one smaller circumference end of said conical shaft comprises a plurality of shaft magnets;

wherein for each rotary flywheel electric energy management device, said at least one electric motor is configured to use said shaft magnets to apply torque to said at least one smaller circumference end of at least one said conical shaft to spin at least one conical shaft.

3. The energy management device of claim 1, further comprising a battery storage system device and an energy control processor.

4. The energy management device of claim 3, comprising a plurality of said rotary flywheel electric energy management devices, all multiplexed together under the control of said energy control processor;

said energy control processor configured to adjust which rotary flywheel electric energy management device stores input electrical energy as its flywheel rotational kinetic energy, and which rotary electric energy management device converts its flywheel rotational kinetic energy into output electrical energy, as a function of changing power supply and power demand conditions.

5. The energy management device of claim 4, wherein said energy control processor is configured to store input electrical energy as flywheel rotational kinetic energy to each said rotary flywheel energy management device in an interleaved manner that first directs input energy to a first rotary flywheel energy management device, and then directs input energy to a second rotary flywheel energy management device.

6. The energy management device of claim 4, wherein said energy control processor is configured to disconnect said electric motors from said battery storage system during periods of low electrical power demand, monitor said electrical power demand;

said energy control processor further configured to monitor speeds of rotation of said conical shafts, and to reconnect said electrical motors to said battery storage system when said speeds of rotation of said conical shafts drop below a preset criteria.

7. The energy management device of claim 6, wherein said plurality of said rotary flywheel electric energy management devices are configured to be connected together to form at least one common rotational shaft.

8. The energy management device of claim 7, wherein at least some of said rotary flywheel electric energy management devices are configured to be connected or disconnected from said at least one common rotational shaft with a clutch controlled by said energy control processor.

9. The energy management device of claim 1, further configured to supply energy to any of electric, hybrid, or hybrid electric vehicles by any of cable connections, wireless induction connections, or hydrogen production via electrolysis.

10. The energy management device of claim 1, further mounted on at least one gimbal to compensate for detrimental effects of varying movement or force applied to said device.

11. The energy management device of claim 1, further comprising any of circuitry to convert direct current (DC) to alternating current (AC) and alternating current (AC) to direct current (DC).

12. The energy management device of claim 1, further configured to draw power from an outside electrical grid, or to supply power to an outside electrical grid.

13. The energy management device of claim 1, further comprising at least one axial electric generator coupled to at least one smaller circumference end of at least one said shaft.

14. The energy management device of claim 1, wherein said flywheel mass and said at least one stators are further surrounded by at least one safety shield, configured from impact resistant materials, and configured to protect against rapid unscheduled disassembly of said flywheel.

15. The energy management device of claim 1, wherein a plurality of motors and generators, or a plurality of combination motor/generators, are configured to share a common rotational shaft; and said device is further configured to drive said plurality of motors and generators or plurality of combination motor/generators in an interleaved manner.

16. The energy management device of claim 1, wherein said shaft tapers from said smaller radius to said larger radius over a distance of 1 foot.

17. The energy management device of claim 14, wherein said impact resistant materials comprise aramid fibers.

18. An energy management device comprising:

at least one rotary flywheel electric energy management device comprising two conical shafts;

each said conical shaft comprising a smaller circumference end with a smaller radius, and a larger circumference end with a larger radius;

each said larger circumference end configured to be hollow;

each said conical shaft configured to taper from said larger radius to said smaller radius so as to form opposite ends of a hollow conical flywheel;

each said smaller circumference ends being suspended on low friction magnetic bearings;

said two conical shafts configured to join together at their larger circumference ends to form at least one hollow conical cavity that encases a flywheel mass;

said flywheel mass primarily comprising a plurality of permanent magnets arranged in any of an axial or radial configuration;

said conical shafts further surrounded by at least one stator comprising a plurality of magnetic pickup coils arranged and electrically connected in a stator configuration, said at least one stator configured so that said conical shafts can rotate freely within said at least one stator;

said magnetic pickup coils and said at least one stator configured so that when said flywheel mass rotates, changing magnetic fields from said plurality of permanent magnets causes electrical current to flow within said plurality of magnetic pickup coils and said at least one stator;

and at least one electric motor configured to apply torque, via magnetic coupling, to at least one smaller circumference end of at least one said conical shaft to spin said conical shaft and said flywheel mass;

each said at least one rotary flywheel electric energy management device further configured to store input electrical energy as flywheel rotational kinetic energy, and to convert said flywheel rotational kinetic energy into output electrical energy;

further comprising a battery storage system device and an energy control processor;

further comprising a plurality of said rotary flywheel electric energy management devices, all multiplexed together under the control of said energy control processor;

said energy control processor configured to adjust which rotary flywheel electric energy management device stores input electrical energy as its flywheel rotational kinetic energy, and which rotary electric energy management device converts its flywheel rotational kinetic energy into output electrical energy, as a function of changing power supply and power demand conditions.

19. An energy management device comprising:

at least one rotary flywheel electric energy management device comprising two conical shafts;

each said conical shaft comprising a smaller circumference end with a smaller radius, and a larger circumference end with a larger radius;

each said larger circumference end configured to be hollow;

each said conical shaft configured to taper from said larger radius to said smaller radius so as to form opposite ends of a hollow conical flywheel;

each said smaller circumference ends being suspended on low friction magnetic bearings;

said two conical shafts configured to join together at their larger circumference ends to form at least one hollow conical cavity that encases a flywheel mass;

said flywheel mass primarily comprising a plurality of permanent magnets arranged in any of an axial or radial configuration;

said conical shafts further surrounded by at least one stator comprising a plurality of magnetic pickup coils arranged and electrically connected in a stator configuration, said at least one stator configured so that said conical shafts can rotate freely within said at least one stator;

said magnetic pickup coils and said at least one stator configured so that when said flywheel mass rotates, changing magnetic fields from said plurality of permanent magnets causes electrical current to flow within said plurality of magnetic pickup coils and said at least one stator;

and at least one electric motor configured to apply torque, via magnetic coupling, to at least one smaller circumference end of at least one said conical shaft to spin said conical shaft and said flywheel mass;

each said at least one rotary flywheel electric energy management device further configured to store input electrical energy as flywheel rotational kinetic energy, and to convert said flywheel rotational kinetic energy into output electrical energy;

wherein said flywheel mass and said at least one stators are further surrounded by at least one safety shield, configured from impact resistant materials, and configured to protect against rapid unscheduled disassembly of said flywheel.

\* \* \* \* \*